(12) United States Patent
Lee et al.

(10) Patent No.: US 12,050,370 B2
(45) Date of Patent: Jul. 30, 2024

(54) DISPLAY DEVICE

(71) Applicant: Samsung Display Co., LTD., Yongin-si (KR)

(72) Inventors: Sang-Gu Lee, Hwaseong-si (KR); Jun Woo You, Seongnam-si (KR); Onnuri Kim, Hwaseong-si (KR); Ho Yun Byun, Hwaseong-si (KR); Young Hye Son, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/114,742

(22) Filed: Dec. 8, 2020

(65) Prior Publication Data

US 2021/0191161 A1     Jun. 24, 2021

(30) Foreign Application Priority Data

Dec. 24, 2019 (KR) .......................... 10-2019-0174432

(51) Int. Cl.
- *G02F 1/01* (2006.01)
- *G02F 1/17* (2019.01)
- *G06V 40/13* (2022.01)

(52) U.S. Cl.
CPC .............. *G02F 1/0126* (2013.01); *G02F 1/17* (2013.01); *G06V 40/1318* (2022.01); *G02F 2203/11* (2013.01)

(58) Field of Classification Search
None
See application file for complete search history.

(56) References Cited

U.S. PATENT DOCUMENTS

| | | | |
|---|---|---|---|
| 8,205,551 B2 | 6/2012 | Begon et al. | |
| 2007/0041073 A1* | 2/2007 | Kumar | G02F 1/1335 359/245 |
| 2007/0053047 A1* | 3/2007 | Kumar | C07D 405/14 359/241 |
| 2015/0109651 A1* | 4/2015 | Branda | B32B 37/12 359/238 |
| 2017/0178595 A1* | 6/2017 | Kim | G09G 3/3275 |
| 2018/0121703 A1* | 5/2018 | Jung | G06K 9/00046 |
| 2019/0012510 A1* | 1/2019 | Xu | G06K 9/0004 |
| 2019/0073505 A1* | 3/2019 | Kwon | G06V 40/1306 |

FOREIGN PATENT DOCUMENTS

| | | |
|---|---|---|
| CN | 109284655 A | 1/2019 |
| JP | 2017193115 A * | 10/2017 |
| JP | 6463673 B2 | 2/2019 |
| KR | 101421238 B1 | 7/2014 |
| KR | 1020150127209 A | 11/2015 |
| KR | 1020180053035 A | 5/2018 |
| KR | 1020180059720 A | 6/2018 |

* cited by examiner

*Primary Examiner* — Christopher Stanford
*Assistant Examiner* — Journey F Sumlar
(74) *Attorney, Agent, or Firm* — CANTOR COLBURN LLP

(57) ABSTRACT

A display device that includes: a display panel; a sensor that is disposed on a side of the display panel; and a discoloration layer that is disposed on an opposite side of the display panel, wherein a transmittance of the discoloration layer may vary by 5 times to 20 times, which depends on whether or not ultraviolet light is present, with respect to light having a wavelength of about 600 nm to about 630 nm.

18 Claims, 14 Drawing Sheets

PRIOR ART

DISPLAY DEVICE

CROSS-REFERENCE TO RELATED APPLICATION

This application claims priority to Korean Patent Application No. 10-2019-0174432 filed in the Korean Intellectual Property Office on Dec. 24, 2019, and all the benefits accruing therefrom under 35 U.S.C. § 119, the entire content of which is incorporated herein by reference.

BACKGROUND

Technical Field

The disclosure relates to a display device, and more particularly, to a display device that includes a fingerprint recognition sensor.

Description of the Related Art

A display device such as liquid crystal display (LCD), an organic light emitting diode (OLED) display, and the like includes a display panel that includes a plurality of pixels that can display an image. Each pixel includes a pixel electrode that receives a data signal, and the pixel electrode may receive a data signal by being connected to at least one transistor. The display device may display an image by using pixels (or a pixel circuit). Recently, some display devices may have additional functions other than image display.

The display device includes an optical member in a bezel at a front side (e.g., one side where an image is displayed), and may recognize an object by using the optical member. For example, when the optical member is a fingerprint recognition sensor, light generated from a light emitting element and then reflected by the finger is received, and the fingerprint can be recognized by recognizing a difference in the amount of reflection caused due to a line or curve of the fingerprint. However, for aesthetic reasons as the bezel of the display device becomes thinner and thinner, the gaze of the user may be fixed or concentrated on the image (or the screen of the display device). Recently, research and development on front display technology, which seeks to remove the bezel on the front of the display device, relocate the optical member (sensor) that traditionally had been disposed on the front (or bezel), and instead, display an image on the entire front of the display device has been advanced and remains of interest.

The above information disclosed in this Background section is only for enhancement of understanding of the background of the invention and therefore it may contain information that does not form the prior art that is already known to a person of ordinary skill in the art.

SUMMARY

Exemplary embodiments have been made in an effort to provide a display device with improved performance of a fingerprint recognition sensor.

A display device according to an exemplary embodiment of the invention includes: a display panel; a sensor that is disposed on a side of the display panel; and a discoloration layer that is disposed on an opposite side of the display panel, wherein transmittance of the discoloration layer may vary by 5 times to 20 times, which depends on whether or not ultraviolet light is present, with respect to light having a wavelength of about 600 nanometers (nm) to about 630 nm.

The discoloration layer may have a transmittance of less than 10% with respect to light having a wavelength of 600 nm to 630 nm in the presence of ultraviolet light, and, the discoloration layer may have a transmittance of 80% or greater with respect to the light having the wavelength of 600 nm to 630 nm in the absence of ultraviolet light.

The sensor may be an optical type of fingerprint recognition sensor.

The discoloration layer may contain a fulgide-based material, a diarylethene-based material, or a combination thereof.

The display device may further include a window, wherein the discoloration layer may be disposed between the display panel and the window.

The display device may further include an adhesive layer that is disposed between the discoloration layer and the display panel.

The display device may further include a window, wherein the window may be disposed between the display panel and the discoloration layer.

The display device may further include a hard coating layer, wherein the discoloration layer may be disposed between the hard coating layer and the display panel.

The discoloration layer may include an adhesive material, and thus, may also have an adhesive function.

The discoloration layer may have transmittance greater than 90% with respect to visible light in an indoor environment.

The discoloration layer may block transmittance of near-infrared light in an outdoor environment, and may transmit near-infrared light in an indoor environment.

A display device according to another exemplary embodiment of the invention includes: a display panel; a sensor that is disposed on a side of the display panel; and a discoloration layer that is disposed between the sensor and the display panel, wherein transmittance of the discoloration layer may vary by 5 times to 20 times, which depends on whether or not ultraviolet light is present, with respect to light of a wavelength of about 600 nm to about 630 nm.

The discoloration layer may have transmittance of less than 10% with respect to light of a wavelength having 600 nm to 630 nm in the presence of ultraviolet light, and, the discoloration layer may have transmittance of 80% or greater with respect to the light having the wavelength of 600 nm to 630 nm in the absence of ultraviolet light.

The sensor may be an optical type of fingerprint recognition sensor.

The discoloration layer may include a fulgide-based material, a diarylethene-based material, or a combination thereof.

The display device may further include an adhesive layer that is disposed between the discoloration layer and the sensor.

The display device may further include an adhesive layer that is disposed between the discoloration layer and the display panel.

The discoloration layer may include an adhesive material, and thus, may also have an adhesive function The discoloration layer may have transmittance of greater than 90% with respect to visible light in an indoor environment.

The discoloration layer may block transmittance of near-infrared light in an outdoor environment, and may transmit near-infrared light in an indoor environment.

According to the exemplary embodiments, a display device of which performance of a fingerprint recognition sensor is improved can be provided.

DETAILED DESCRIPTION OF THE EMBODIMENTS

Figure 1:
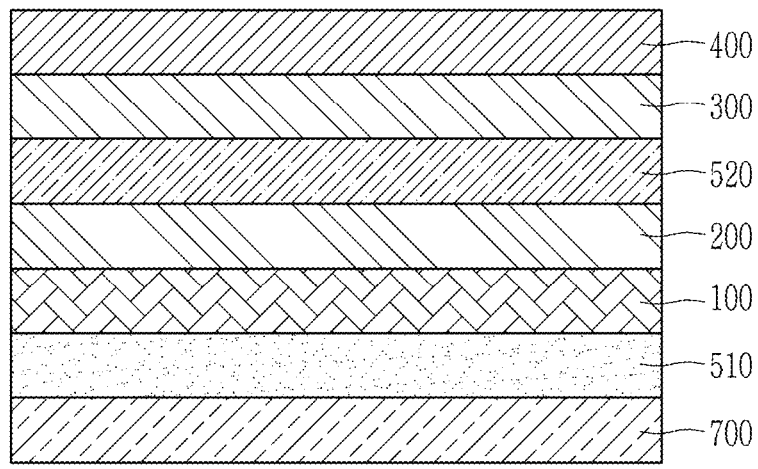
FIG. 1 schematically illustrates a cross-section of a display device according to an exemplary embodiment of the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. As those skilled in the art would realize, the described embodiments may be modified in various different ways, all without departing from the spirit or scope of the invention.

The drawings and description are to be regarded as illustrative in nature and not restrictive. Like reference numerals designate like elements throughout the specification. Further, in the drawings, size and thickness of each element are arbitrarily reed for better understanding and ease of description, but the invention is not limited thereto. In the drawings, the thickness of layers, films, panels, regions, etc., are exaggerated for clarity. In addition, in the drawings, the thickness of some layers and regions is exaggerated for better understanding and ease of description.

It will be understood that when an element such as a layer, film, region, or substrate is referred to as being "on" another element, it can be directly on the other element or intervening elements may also be. In contrast, when an element is referred to as being "directly on" another element, there are no intervening elements present. The word "on" or "above" means positioned on or below the object portion, and does not necessarily mean positioned on the upper side of the object portion based on a gravitational direction. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Further, in this specification, the phrase "on a plane" means viewing a target portion from the top, and the phrase "on a cross-section" means viewing a cross-section formed by vertically cutting a target portion from the side.

FIG. 1 schematically illustrates a cross-section of a display device according to an exemplary embodiment of the invention. Referring to FIG. 1, a display device according to the exemplary embodiment includes a sensor 700 disposed below a display panel 100, and a discoloration layer 400 disposed above the display panel 100. h Specifically, the display device according to the exemplary embodiment of FIG. 1 may include the sensor 700 that senses a fingerprint and the like, a first adhesive layer 510 that bonds the sensor 700 and the display panel 100, a polarization layer 200 disposed on the display panel 100, a second adhesive layer 520 that bonds the polarization layer 200 and a window 300, and the discoloration layer 400 disposed on the window 300.

The first adhesive layer 510 and the second adhesive layer 520 are optional, and therefore, may be omitted depending on exemplary embodiments. The discoloration layer 400 is illustrated to be disposed above the window 300, but may be positioned between the described other layers of FIG. 1, and will depend on other exemplary embodiments.

In the invention, the discoloration layer 400 is a layer of which transmittance with respect to a wavelength of a near-infrared region (600 nm to 630 nm) will vary depending upon in indoor and outdoor environment, and sensitivity of the sensor 700 can be increased as the transmittance with respect to a specific wavelength varies according to its location in an indoor or outdoor environment. An exemplary detailed effect will be described later.

In the exemplary embodiment, transmittance of the discoloration layer with respect to a wavelength range of 600 nm to 630 nm will significantly change or vary depending on an indoor/outdoor environment.

In an indoor environment, the discoloration layer 400 may have transmittance of 80% or greater with respect to a wavelength range of 600 nm to 630 nm. However, in an outdoor environment, the discoloration layer 400 may have transmittance of 10% or less with respect to a wavelength range of 600 nm to 630 nm. Accordingly, the transmittance of the discoloration layer 400 according to a wavelength of 600 nm to 630 nm may differ by 5 times to 10 times depending upon whether the display device of which the discoloration layer is part is located in an indoor and outdoor environment.

In the specification, the terms "indoor environment" and "outdoor environment" are distinguished from one another with reference to the relative amounts of ultraviolet (UV) light that the discoloration layer, which may be component part of a display device, is exposed to. In an outdoor environment, both ultraviolet (UV) light and near-infrared light are regions of the electromagnetic spectrum present in natural light. Of course, the actual amounts of ultraviolet and near-infrared light in natural light will depend upon seasonal as well as then-current weather conditions. Herein, the term "outdoor environment" refers to an environment with light of greater than or equal to 1000 Lux. In contrast, the term "indoor environment" refers to an environment with light of less 1000 Lux. A person of ordinary skill would measure the amount of light present including an amount of UV light with a light meter.

The discoloration layer 400 may include a material of which a molecular structure is changed, e.g., such a molecular change may involve a ring-opening or ring forming isomerization, by absorption of ultraviolet (UV) light. Accordingly, as the molecular structure of the material is changed, the wavelength of light absorbed by the discoloration layer 400 also changes, and hence, there is a change in transmittance according to a wavelength of 600 nm to 630 nm.

For example, the discoloration layer 400 may include a fulgide-based material, a diarylethene-based material, or a combination of the two materials. In the specification, the fulgide-based material implies a material that includes at least one fulgide. Likewise, in the specification, diarylethene-based material implies a material that includes at least one diarylethene.

For example, a molecular structure of the fulgide-based material may change due to UV absorption as shown in the following isomerization scheme below. Of course, the molecular scheme below is just one exemplary embodiment, and is not intended to limit the invention in any manner.

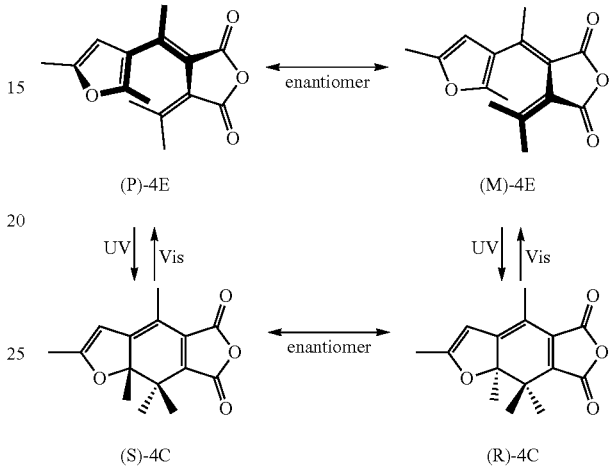

In addition, a molecular structure of the diarylethene-based material may be reversibly changed due to UV absorption. Again, the molecular scheme below is just one exemplary embodiment, and is not intended to limit the invention in any manner.

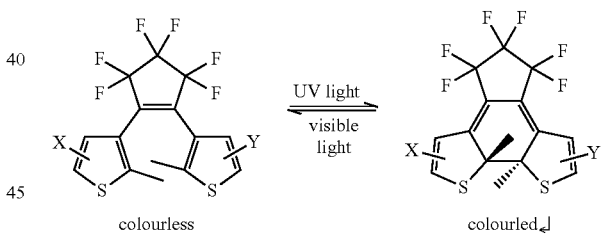

In the chemical formula, X and Y may independently be H, a C1 to C2 alkyl group, a phenyl, or a heteroaryl.

These materials change the absorption spectrum and change the color of the material due to reversible isomerization or free radical generation by dissociation in the presence of ultraviolet (UV) light.

Figure 2:
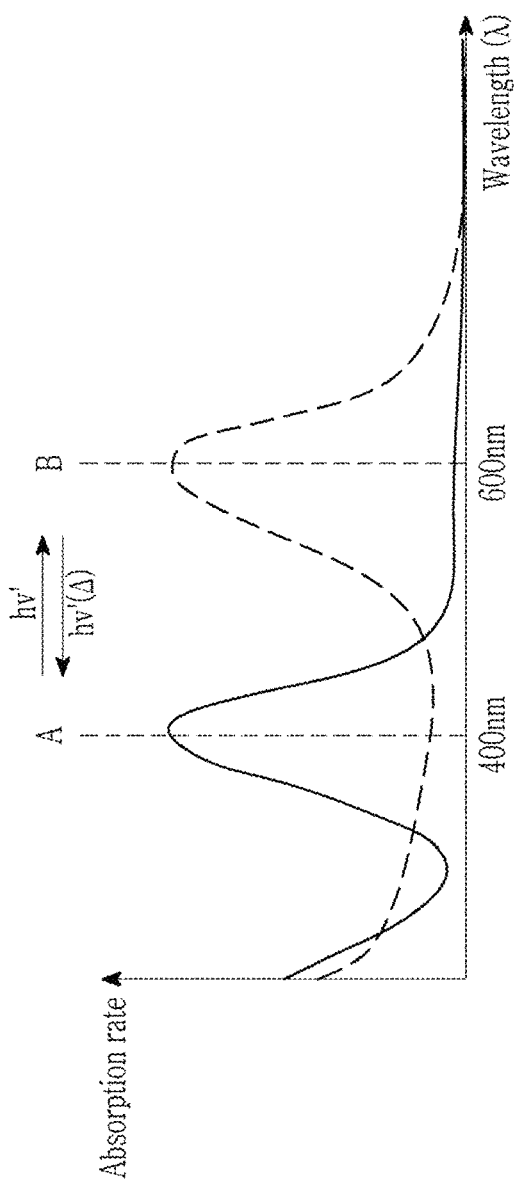
FIG. 2 shows a spectrum change according to ultraviolet absorption of a discoloration layer according to the exemplary embodiment of the invention.

FIG. 2 represents a spectrum change according to UV absorption of the discoloration layer according to the exemplary embodiment of the invention. Referring to FIG. 2, an absorption spectrum of the discoloration layer 400 according to the exemplary embodiment is shifted to the right side (to lower energy) (A to B) in the presence of UV light. As shown in FIG. 2, in the presence of UV light, the discoloration layer 400 absorbs wavelengths at about 600 nm.

However, in the near-absence of UV light, the absorption spectrum of the discoloration layer 400 is shifted to the left side (to higher energy) (B to A). Thus, the discoloration layer 400 absorbs wavelengths at about 400 nm in the near-absence of UV light.

As described, since a wavelength absorbed by the discoloration layer 400 is changed depending on the presence of the ultraviolet light, the near-infrared light can be selectively reduced, blocked, or cut by the discoloration layer in an indoor or outdoor environment, thereby increasing sensitivity of the sensor 700.

Hereinafter, the effect will be described in detail.

Figure 3:
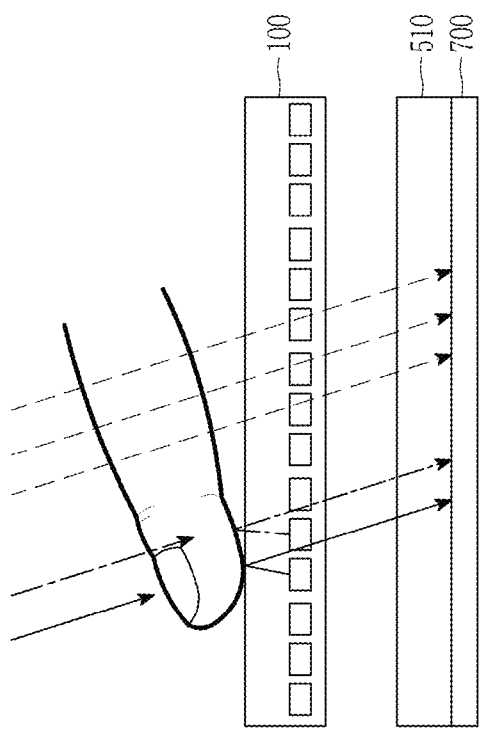
FIG. 3 shows a sensor of a display device in the prior art that does not include a discoloration layer.

FIG. 3 illustrates a sensor of a display device in the art that does not include the discoloration layer 400. That is, a display device of FIG. 3 includes a display panel 100 and a sensor 700. The sensor 700 may be an optical type of fingerprint recognition sensor. Light generated from a light emission element is reflected by a finger that touches a front surface of the display panel 100 and then returns to a rear surface of the display panel 100, and the optical fingerprint sensor of the optical type senses the light returned to the rear surface of the display panel 100. Due to the curvature of the fingerprint, a difference in the reflection amount is generated, and the difference in the reflection amount must be recognized in the same form without a change in the surrounding environment, so that consistency of the optical fingerprint recognition can be enhanced.

However, as shown in FIG. 3, since the wavelength of the near-infrared region (shown by a dotted line) is transmitted through the human hand, a fingerprint recognized by generation of a difference in reflected light is distorted, thereby causing a recognition error of a stored fingerprint.

Figure 4:
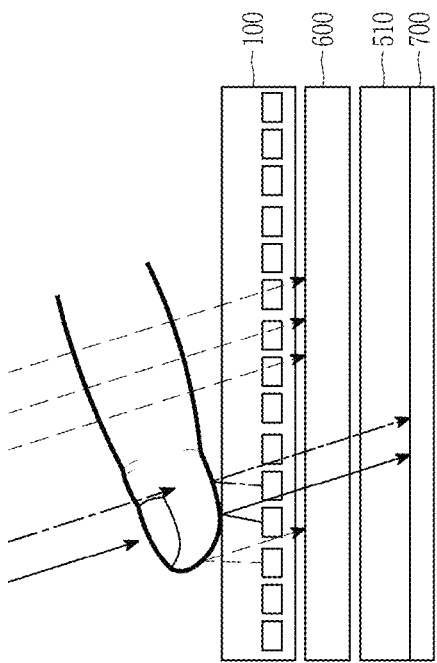
FIG. 4 shows a cross-section of a display device in the prior art where a near-infrared cutting layer is disposed between a display panel and a sensor.

FIG. 4 shows a cross-section of a display device of the art where a near-infrared cutting layer 600 is disposed between a display panel 100 and a sensor 700. Referring to FIG. 4, a near-infrared cutting layer 600 cuts a wavelength in a near-infrared region, transmitted through the human hand, and thus the matching of optical fingerprint recognition can be improved. However, since the near-infrared cutting layer 600 in FIG. 4 cuts the light reflected by the finger and returned to the rear surface, the efficiency of fingerprint recognition may be reduced. In particular, in an indoor environment where there is insufficient light, the light reflected by the finger is cut by the near-infrared cutting layer 600 and the performance of fingerprint recognition may be reduced.

In addition, the near-infrared cutting layer 600 may also absorb light near the far red of the visible spectrum, and thus the near infrared cutting layer 600 may not be completely transparent, and exhibit a touch of color. Accordingly, the near-infrared cutting layer 600 would need to be positioned below the display panel 100. Moreover, it may be difficult to position the near-infrared light cutting layer 600 above the display panel 100.

In contrast, the display device according to the exemplary embodiment includes a discoloration layer 400 disposed in a top surface of the display panel 100. Since an absorption spectrum varies with the presence of ultraviolet (UV) light, the discoloration layer 400 can maintain the fingerprint recognition performance of the sensor in both indoor and outdoor environments. That is, ultraviolet (UV) and near-infrared light is present in relatively large amounts in an outdoor environment compared to an indoor environment. In this case, a structure of the discoloration layer 400 is changed due to the presence of ultraviolet light, and thus the discoloration layer 400 absorbs light having a wavelength of 600 nm to 630 nm. That is, the near-infrared light is cut by the discoloration layer 400, and thus performance of the optical type fingerprint recognition sensor can be maintained.

In an indoor environment, ultraviolet (UV) and near-infrared light is present in relatively very small or trace amounts if at all compared to an outdoor environment. In this case, the molecular structure of the discoloration layer 400 had changed due to the absorption of ultraviolet light will return to its original structure. Thus, the discoloration layer 400 is transparent and does not affect display quality of the display panel 100. In addition, since the near-infrared light is not cut by the discoloration layer 400, performance of the optical type fingerprint recognition sensor can be maintained.

As described, the display device according to the exemplary embodiment includes the discoloration layer 400 of which an absorption spectrum will vary according to presence of ultraviolet light, and thus performance and transparency of the optical type of fingerprint recognition sensor can be maintained in both indoor and outdoor environments. That is, in an outdoor environment where ultraviolet and near-infrared light is present, the molecular structure of the discoloration layer 400 changes to a molecular structure that absorbs near-infrared light, and performance of the fingerprint recognition sensor can be maintained. Moreover, in the indoor environment where there is a small amount of ultraviolet and near-infrared light, the molecular structure of the discoloration layer 400 changes to a molecular structure that transmits visible light such that transparency can be maintained, and performance of the fingerprint recognition sensor can be maintained.

FIG. 5 to FIG. 8 are provided to determine a correlation between a cut wavelength and sensing performance of the optical type of fingerprint recognition sensor by using a cutting filter that cuts various wavelengths. In FIG. 5 to FIG. 8, a sensor 700 is located inside a case 900, and filters 1100, 1200, and 1300, respectively, block different wavelengths positioned at an entrance of the case 900.

The term "blocks light" means that a component of the display device, e.g., a filter layer or a discoloration layer, will reduce the transmittance of light of a stated wavelength, wavelength range, or a region of the electromagnetic spectrum, by at least 80%, preferably, by at least 90%.

Figure 5:
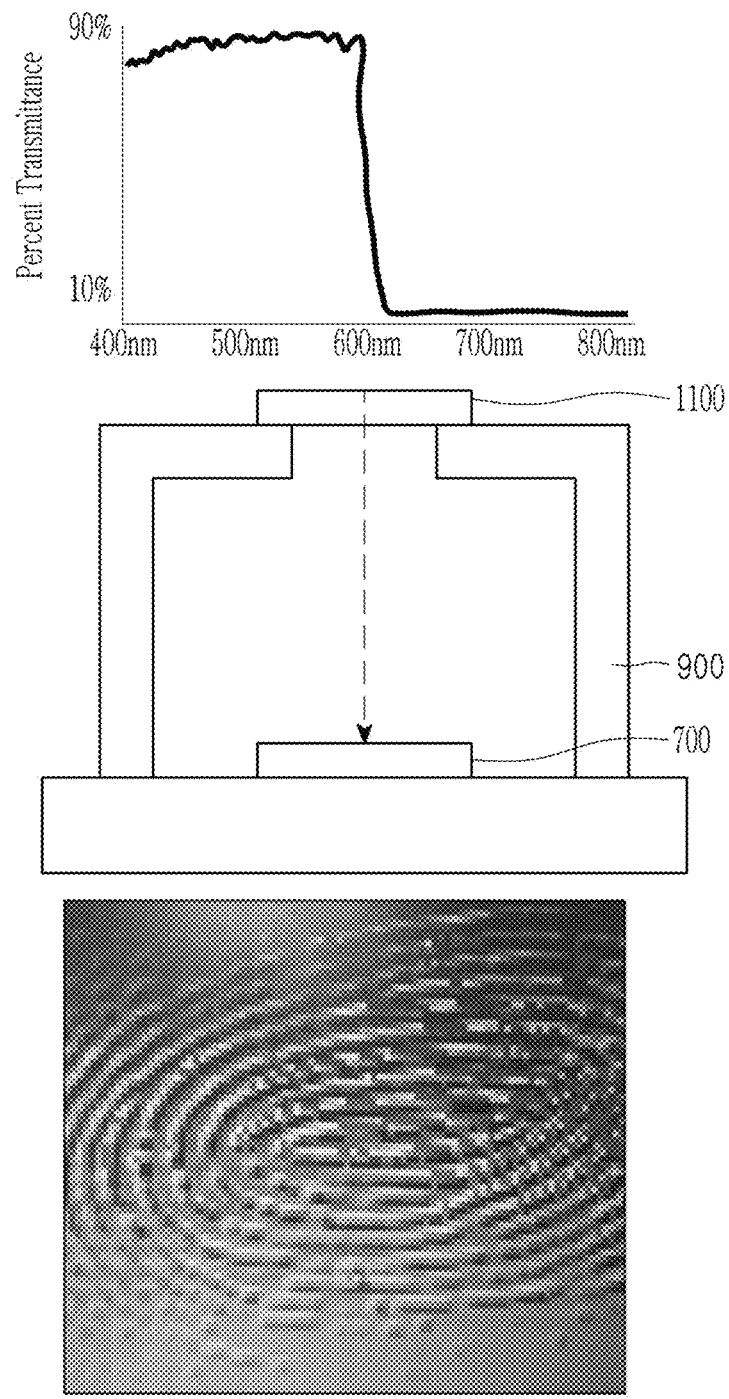
FIG. 5 represents a correlation of the invention between a cut wavelength and sensing performance of the optical type of fingerprint recognition sensor by using a cutting filter that cuts various wavelengths.

Referring to FIG. 5, when a first filter 1100 that blocks light of about a 600 nm wavelength was used, a fingerprint was effectively recognized.

Figure 6:
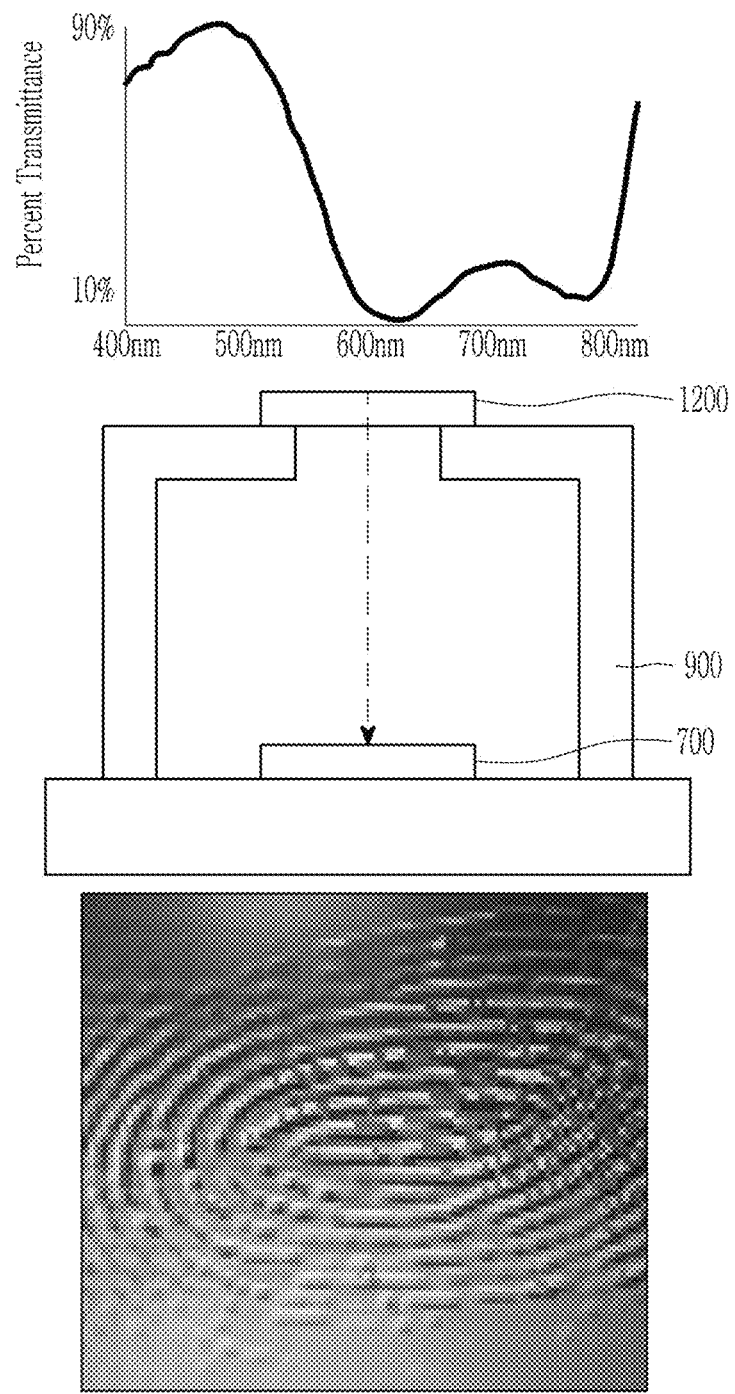
FIG. 6 represents a correlation between a cut wavelength and sensing performance of the optical type of fingerprint recognition sensor by using a cutting filter that cuts various wavelengths.

In addition, in FIG. 6, when a second filter 1200 that blocks a light of about 600 nm wavelength was used, a fingerprint was effectively recognized.

Figure 7:
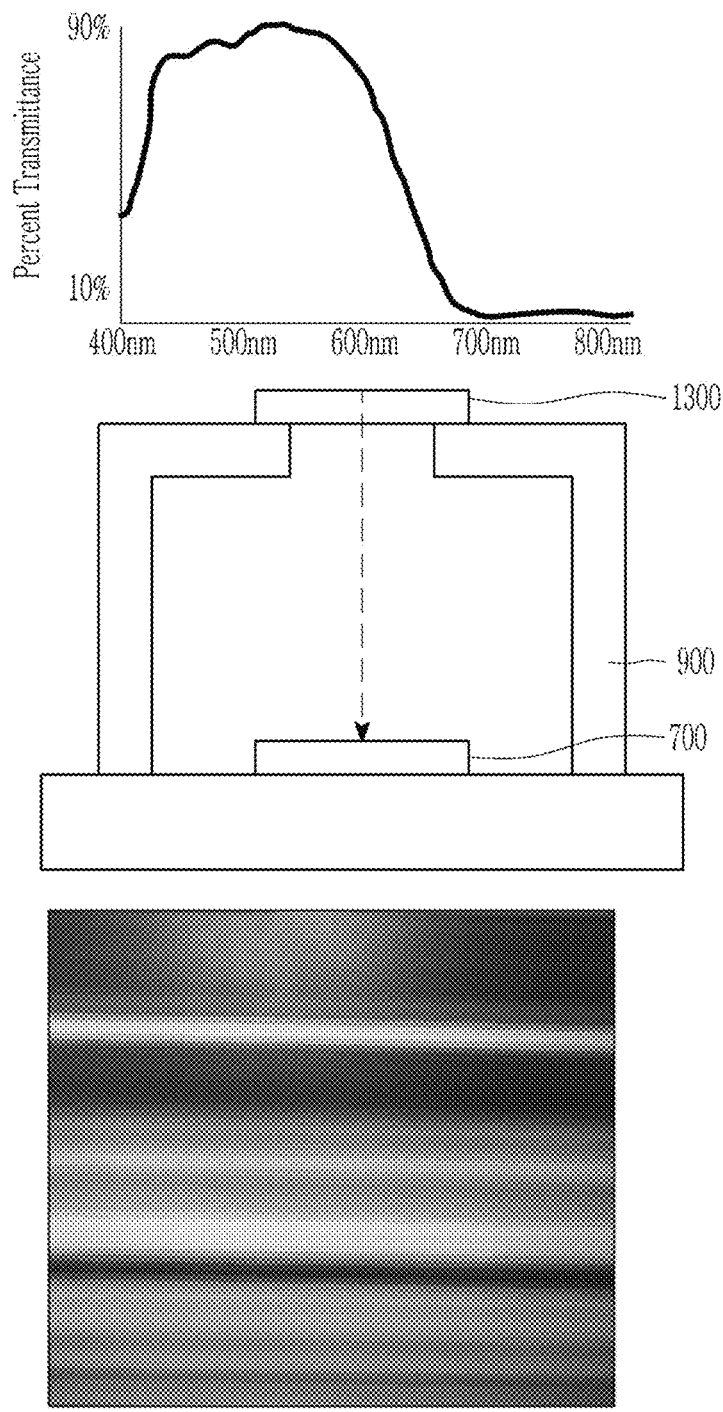
FIG. 7 represents a comparative correlation of a between a cut wavelength and sensing performance of the optical type of fingerprint recognition sensor by using a cutting filter that cuts various wavelengths.

However, referring to FIG. 7, when a third filter 1300 that blocks light of about a 700 nm wavelength was used, a fingerprint was not recognized. This is because near-infrared light transmitted through the third filter 1300 distorts fingerprint recognition of the optical type of fingerprint recognition sensor.

Figure 8:
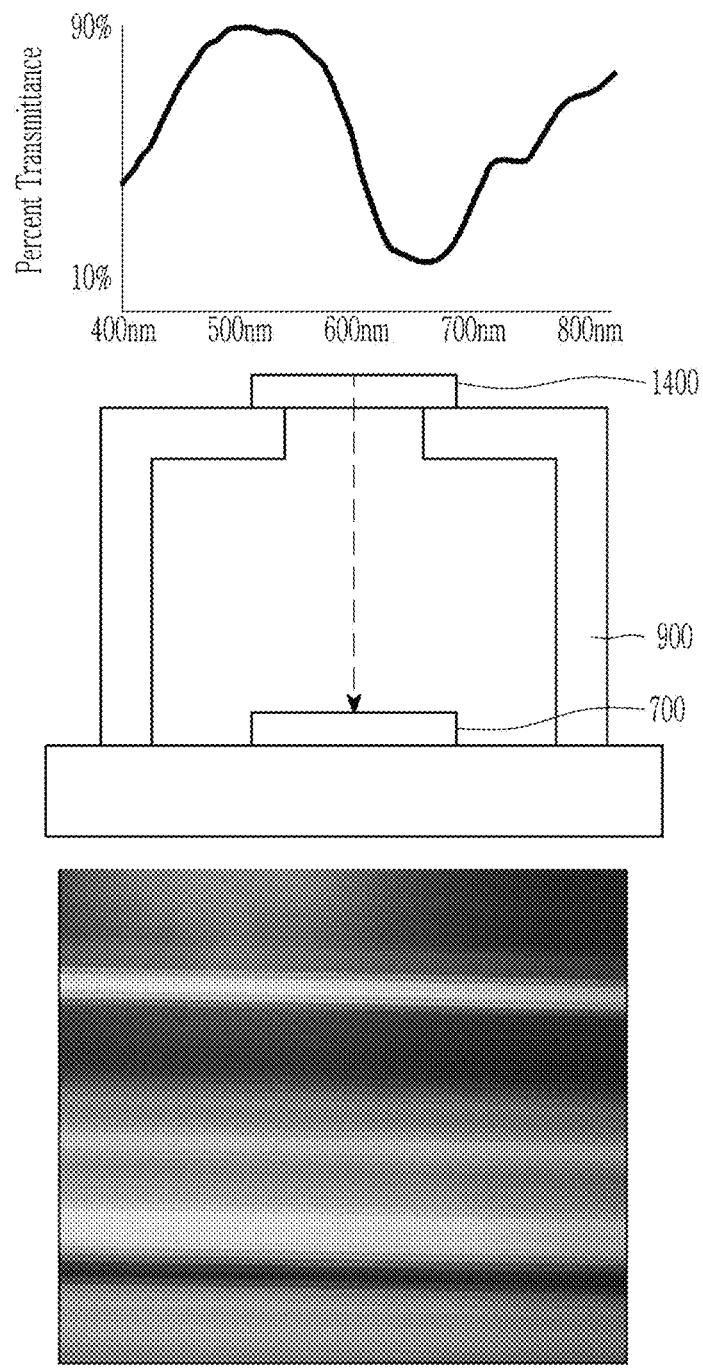
FIG. 8 represents a comparative correlation of a between a cut wavelength and sensing performance of the optical type of fingerprint recognition sensor by using a cutting filter that cuts various wavelengths.

Likewise, referring to FIG. 8, when a fourth filter 1400 that does not sufficiently block light of about a 600 nm wavelength was used, a fingerprint was not recognized.

Thus, the experiment results shown in FIG. 5 to FIG. 8 show that blocking light of about a 600 nm wavelength can improve performance of the optical type of fingerprint recognition sensor. The discoloration layer 400 of the display device according to the exemplary embodiment can improve performance of the optical type of fingerprint recognition sensor because transmittance with respect to light having a wavelength of about 600 nm to about 630 nm in an outdoor environment where ultraviolet and near-infrared light is present is less than 10%.

In FIG. 1, the discoloration layer 400 is disposed above the window 300, but this need not be the case as other embodiments can have the discoloration layer positioned between the window and the sensor.

Hereinafter, display devices according to exemplary variations of the invention will be described in detail.

Figure 9:
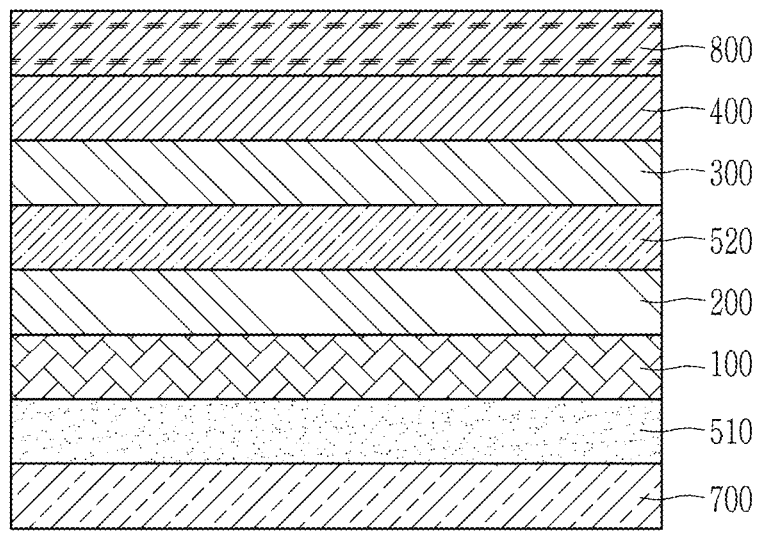
FIG. 9 illustrates a cross-section of a display device according to another exemplary embodiment of the invention.

FIG. 9 illustrates a cross-section that is similar to the cross-section shown in FIG. 1 with respect to a display device according to another exemplary embodiment. Referring to FIG. 9, a display device according to the exemplary embodiment further includes a hard coating layer 800 disposed above a discoloration layer 400. The display device according to the exemplary embodiment of FIG. 9 is similar to the display device of FIG. 1 except for the configuration of the hard coating layer 800, and therefore detailed descriptions of identical constituent elements are omitted.

Figure 10:
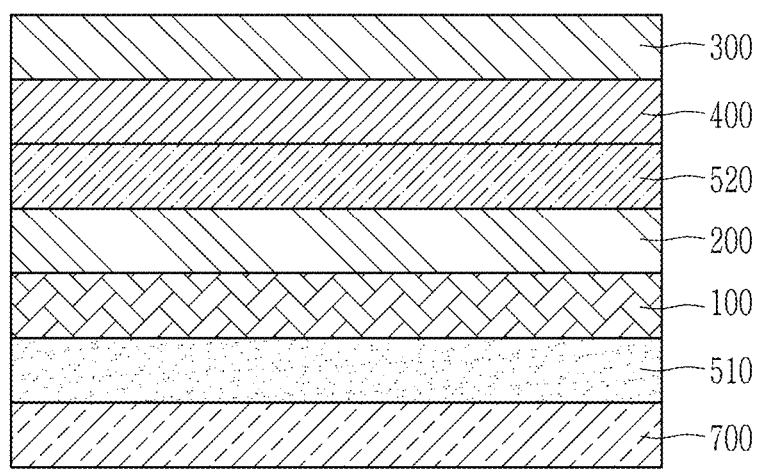
FIG. 10 illustrates a cross-section of a display device according to another exemplary embodiment of the invention.

FIG. 10 illustrates a cross-section that is similar to the cross-section shown in FIG. 1 in a display device according to another exemplary embodiment except that a discoloration layer 400 is disposed between a window 300 and a second adhesive layer 520. Detailed descriptions of identical constituent elements are omitted.

Referring to FIG. 10, in the display device according to the exemplary embodiment, a discoloration layer 400 is disposed between the window 300 and the second adhesive layer 520

In this case, as in the exemplary embodiment of FIG. 1, the absorption spectrum of the discoloration layer 400 changes as the device location changes from an indoor to an outdoor environment such that near-infrared light can be selectively blocked.

Figure 11:
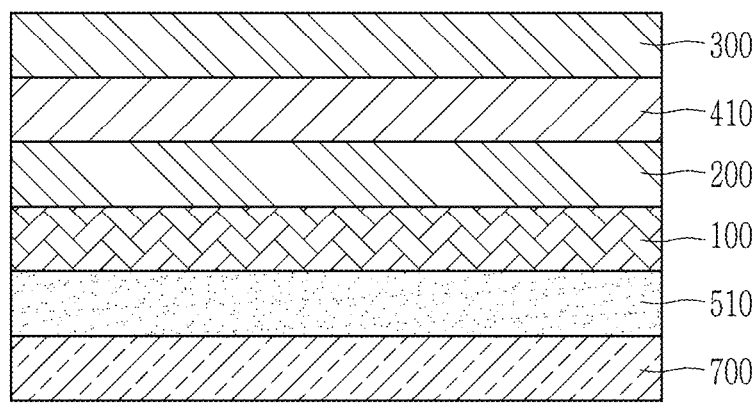
FIG. 11 illustrates a cross-section of a display device according to another exemplary embodiment of the invention.

FIG. 11 illustrates a cross-section that is similar to the cross-section shown in FIG. 1 in a display device according to another exemplary embodiment except that a discoloration adhesive layer 410 is a combination of an adhesive layer and a discoloration layer material, instead of a separate discoloration layer 400 and a second adhesive layer 520. Detailed descriptions of identical constituent elements are omitted.

Referring to FIG. 11, in the display device according to the exemplary embodiment, the second adhesive layer 520 and the discoloration layer 400 are integrated with the discoloration adhesive layer 410. The discoloration adhesive layer 410 includes an adhesive material and a discoloration material included in the adhesive material, and is able to bond with a window 300 and a polarization layer 200, and selectively blocks near-infrared light since an absorption spectrum of the discoloration adhesive layer 410 changes as the device location changes from an indoor to an outdoor environment.

Figure 12:
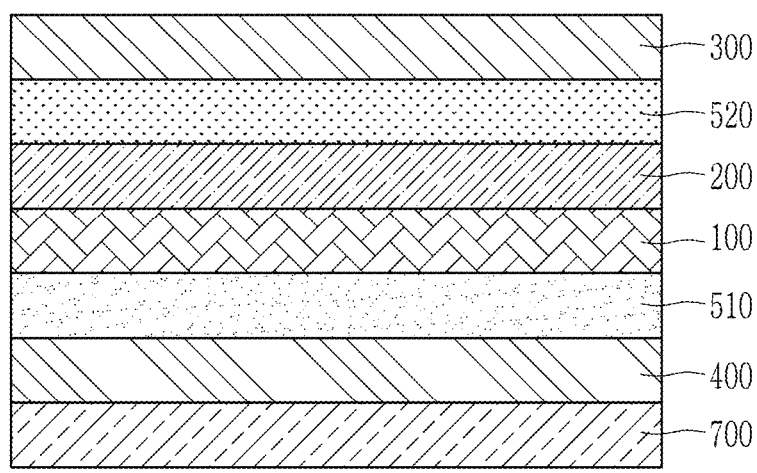
FIG. 12 illustrates a cross-section of a display device according to another exemplary embodiment of the invention.

FIG. 12 illustrates a cross-section that is similar to the cross-section shown in FIG. 1 in a display device according to another exemplary embodiment except that a discoloration layer 400 is disposed between a first adhesive layer 510 and a sensor 700.

In the previous exemplary embodiment, the discoloration layer 400 is disposed above the display panel 100, but the same effect can be obtained when the discoloration layer 400 is disposed below the display panel 100. It may be preferable for the discoloration layer 400 to be disposed below the display panel 100 in an outdoor environment, and even if the discoloration layer 400 loses some transparency, it does not affect the display quality.

Figure 13:
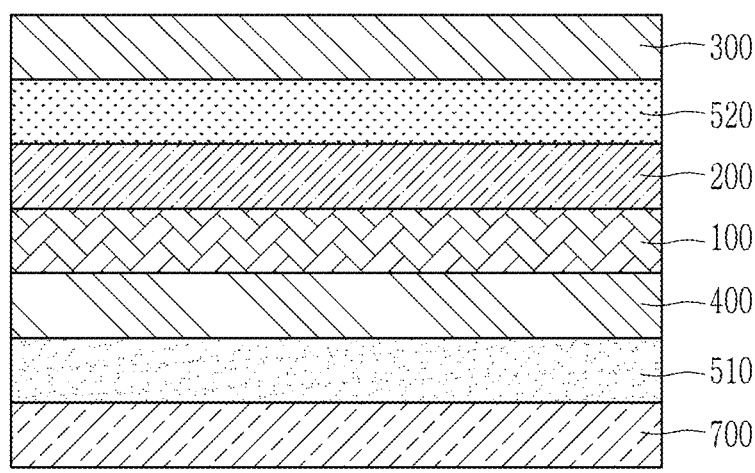
FIG. 13 illustrates a cross-section of a display device according to another exemplary embodiment of the invention.

FIG. 13 illustrates a cross-section that is similar to the cross-section shown in FIG. 12 in a display device according to another exemplary embodiment. The display device according to the exemplary embodiment of FIG. 12 is the same as the display device of FIG. 1, except that a discoloration layer 400 is disposed between a first adhesive layer 510 and a display panel 100. The effect is the same as in the exemplary embodiment of FIG. 12, and thus a detailed description is omitted.

Figure 14:
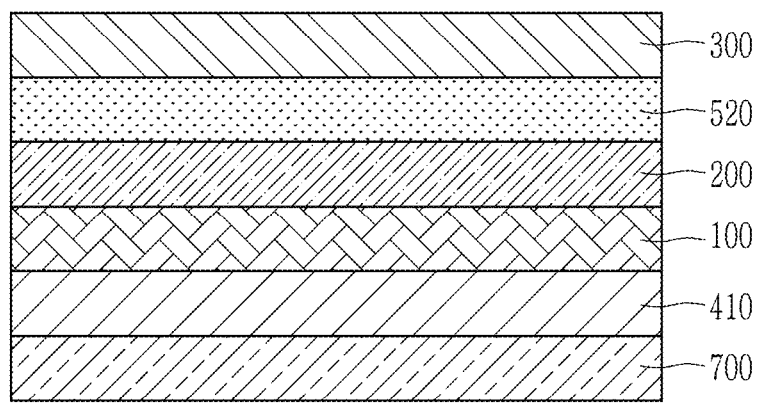
FIG. 14 illustrates a cross-section of a display device according to another exemplary embodiment of the invention.

FIG. 14 illustrates a cross-section that is the same as the cross-section shown in FIG. 12 in a display device according to another exemplary embodiment except that a discoloration adhesive layer 410, which is a combination of an adhesive layer and a discoloration material, is included instead of a separate discoloration layer 400 and a first adhesive layer 510. Detailed descriptions of identical constituent elements is omitted.

Referring to FIG. 14, in the display device according to the exemplary embodiment, the first adhesive layer 510 and the discoloration layer 400 are integrated with the discoloration adhesive layer 410. The discoloration adhesive layer 410 includes an adhesive material and a discoloration material included in the adhesive material, and bonds with a display panel 100 and a sensor 700, and selectively blocks near-infrared light because an absorption spectrum of the discoloration adhesive layer 410 changes as the device location changes from an indoor to an outdoor environment.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A display device comprising:
   a display panel;
   a sensor that is disposed on a side of the display panel;
   a discoloration layer disposed on an opposite side of the display panel, and
   an adhesive layer that is disposed between the discoloration layer and the display panel, and
   a hard coating layer, wherein the discoloration layer is disposed between the hard coating layer and the display panel,
   wherein the discoloration layer blocks transmittance of near-infrared light in an outdoor environment and can transmit near-infrared light in an indoor environment.

2. The display device of claim 1, wherein the sensor is an optical type of fingerprint recognition sensor.

3. The display device of claim 1, wherein the discoloration layer comprises a fulgide-based material, a diarylethene-based material, or a combination thereof.

4. The display device of claim 1, further comprising a window,
   wherein the discoloration layer is disposed between the display panel and the window.

5. The display device of claim 1, further comprising a window,
   wherein the window is disposed between the display panel and the discoloration layer.

6. The display device of claim 1, wherein the discoloration layer comprises an adhesive material.

7. The display device of claim 1, wherein the transmittance of the discoloration layer is greater than 90% with respect to visible light in an indoor environment.

8. A display device comprising:
   a display panel;
   a sensor that is disposed on a side of the display panel;
   a discoloration layer that is disposed between the sensor and the display panel, and
   an adhesive layer that is disposed between the discoloration layer and the display panel, wherein the transmittance of the discoloration layer is greater than 90% with respect to visible light in an indoor environment.

9. The display device of claim 8, wherein the sensor is an optical type of fingerprint recognition sensor.

10. The display device of claim 8, wherein the discoloration layer comprises a fulgide-based material, a diarylethene-based material, or a combination thereof.

11. The display device of claim 8, further comprising an adhesive layer that is disposed between the discoloration layer and the sensor.

12. The display device of claim 8, wherein the discoloration layer comprises an adhesive material.

13. The display device of claim 8, wherein the discoloration layer blocks transmittance of near-infrared light in an outdoor environment and transmits near-infrared light in the indoor environment.

14. A display device comprising:
a display panel;
an optical type fingerprint recognition sensor disposed on a side of the display panel; and
a discoloration layer disposed on an opposite side of the display panel, and
a transmittance of the discoloration layer is less than 10% in an outdoor environment and is greater than 90% in an indoor environment with respect to light having a wavelength of about 600 nanometers to about 630 nanometers.

15. The display device of claim 14, further comprising a window.

16. The display device of claim 1, wherein a transmittance of the discoloration layer is less than 10% in the presence of ultraviolet light and 80% or greater in the absence of ultraviolet light.

17. The display device of claim 8, wherein a transmittance of the discoloration layer is less than 10% in the presence of ultraviolet light and 80% or greater in the absence of ultraviolet light.

18. A display device comprising:
a display panel;
a sensor that is disposed on a side of the display panel;
a discoloration layer disposed on an opposite side of the display panel, and
an adhesive layer that is disposed between the discoloration layer and the display panel, and
a hard coating layer, wherein the discoloration layer is disposed between the hard coating layer and the display panel,
wherein a transmittance of the discoloration layer is less than 10% in the presence of ultraviolet light and 80% or greater in the absence of ultraviolet light.

\* \* \* \* \*